United States Patent [19]

Stiasny

[11] 4,134,720
[45] Jan. 16, 1979

[54] JET PIPE SEAL
[75] Inventor: Carl-Heinz Stiasny, Bruneck, Italy
[73] Assignee: Birfield Trasmissioni S.p.A, Bruneck, Italy
[21] Appl. No.: 813,661
[22] Filed: Jul. 7, 1977
[30] Foreign Application Priority Data
Aug. 24, 1976 [IT] Italy .................. 26471 A/76
[51] Int. Cl.² .......................................... F23B 5/14
[52] U.S. Cl. ............................. 432/209; 126/91 A
[58] Field of Search .................. 126/91 R, 91 A; 432/209

[56] References Cited
U.S. PATENT DOCUMENTS 2,822,798 2/1958 Ipsen ............................ 126/91 A
3,154,133 10/1964 Launder ........................ 432/209

Primary Examiner—Carroll B. Dority, Jr.
Attorney, Agent, or Firm—Toren, McGeady and Stanger

[57] ABSTRACT

A jet pipe containing a burner extends through the interior of an industrial furnace. A seal for sealing the interior of the jet pipe from the interior of the industrial furnace, is positioned between an end face of the jet pipe and a flange having a recess in which the end face of the jet pipe seats. The seal is made of a material, preferably a lead-copper alloy, which is in the solid state when the temperature of the furnace is below a predetermined operating range and which changes into the plastic state as the temperature of the furnace increases and reaches the operating range of the furnace. Preferably, the seal is shaped as an annular member with a cylindrical extension having an outside diameter corresponding to the inside diameter of the jet pipe.

4 Claims, 5 Drawing Figures

JET PIPE SEAL

BACKGROUND OF THE INVENTION

The present invention relates generally to jet pipe burners for use in an industrial furnace and more particularly to a seal for sealing the interior of the jet pipe containing the burner from the interior of the furnace. The seal is arranged between an end face of the jet pipe and a burner flange containing a recess for receiving that end of the jet pipe.

Typically, seals of this type have been made of silicone and, accordingly, are susceptible to natural wear. Such seals have a relatively short service life. If a silicone ring or seal is damaged, leaks will occur and the protective gas within the furnace will flow into the jet pipe where it will burn with a very intense flame. Consequently, this will lead to significant damage to the heating system. There is also a possibility that heating gas will flow from within the jet pipe into the interior of the furnace and will adversely affect the atmosphere within the furnace by increasing its $CO_2$ content. This will result because either the carburization time is increased or, if this time remains constant, the marginal carburization will be reduced. During the carburization process, the furnace atmosphere contains approximately 0.05% to 0.15% of $CO_2$, while the fuel gas in the jet pipe contains from 10 to 12% $CO_2$. The seal is replaced, however, only after the furnace atmosphere is highly contaminated and, as a result, there is an increased loss of protective gas and a longer carburization period. Additionally, protective gas in the jet pipe causes false flame formation which results in increased damage to the jet pipes and burners. Replacement of a damaged seal requires shutdown of the furnace which tends to be very costly.

Accordingly, the primary object of the present invention is to provide a seal which, while furnace temperatures increase, affords a hermetic sealing action between the interior of the jet pipe in an industrial furnace and the interior of the furnace so that the necessary carbon potential in the furnace can be rapidly reached, and the maintenance costs for the industrial furnace can be reduced.

SUMMARY OF THE INVENTION

This object of the present invention is accomplished by providing a seal made of a material which is in the solid state when the furnace temperature is below a pedetermined operating range and which changes over into the plastic state as the temperature increases and reaches the operating range.

The present invention provides a significant advantage in that a perfect seal is insured as a result of the seal being changed into the plastic state when the operating temperature range of the furnace is reached. Further, an adequate seal is afforded when the temperature of the furnace is below the operating range. As a result, none of the burner waste gases leak into the interior of the furnace when it is heated. By positioning this seal between an end face of the jet pipe and a recess in the flange of the burner into which the jet pipe seats, the jet pipe becomes impressed into the material of the seal as a result of its own weight and a very tight seal will result. Accordingly, even frequent furnace heating cycles will not have an adverse effect on the seal. The provision of the seal in accordance with the present invention also provides another significant advantage in that vibrations and shocks which occur within the furnace will not cause any significant damage to the jet pipes, which are formed principally of ceramic material, because the jet pipes are embedded in the soft material of the seal. As a result of these advantages, the maintenance costs of the furnace will be reduced.

For further operating temperatures in the range of approximately 650° C. to 950° C. the preferred seal material is a lead-copper alloy, with the lead portion amounting to approximately 60% to 70% by weight of the alloy and the copper portion consisting of approximately 40% to 30% by weight thereof. As the operating temperature ranges of the furnace increase, the percentage of the copper portion of the lead-copper alloy need only be increased to accommodate the higher ranges.

To improve the sealing effect of the jet pipe, the seal of the present invention can be shaped as an annular member with a cylindrical extension having an outside diameter corresponding to the inside diameter of the jet pipe. This will provide for a tight seal and also tend to center the jet pipe. To strengthen the seal and prevent the material of the seal from flowing into the interior of the furnace during operation of the jet pipe, the seal can be clamped and supported by a supporting angle ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE INVENTION

Figure 1:
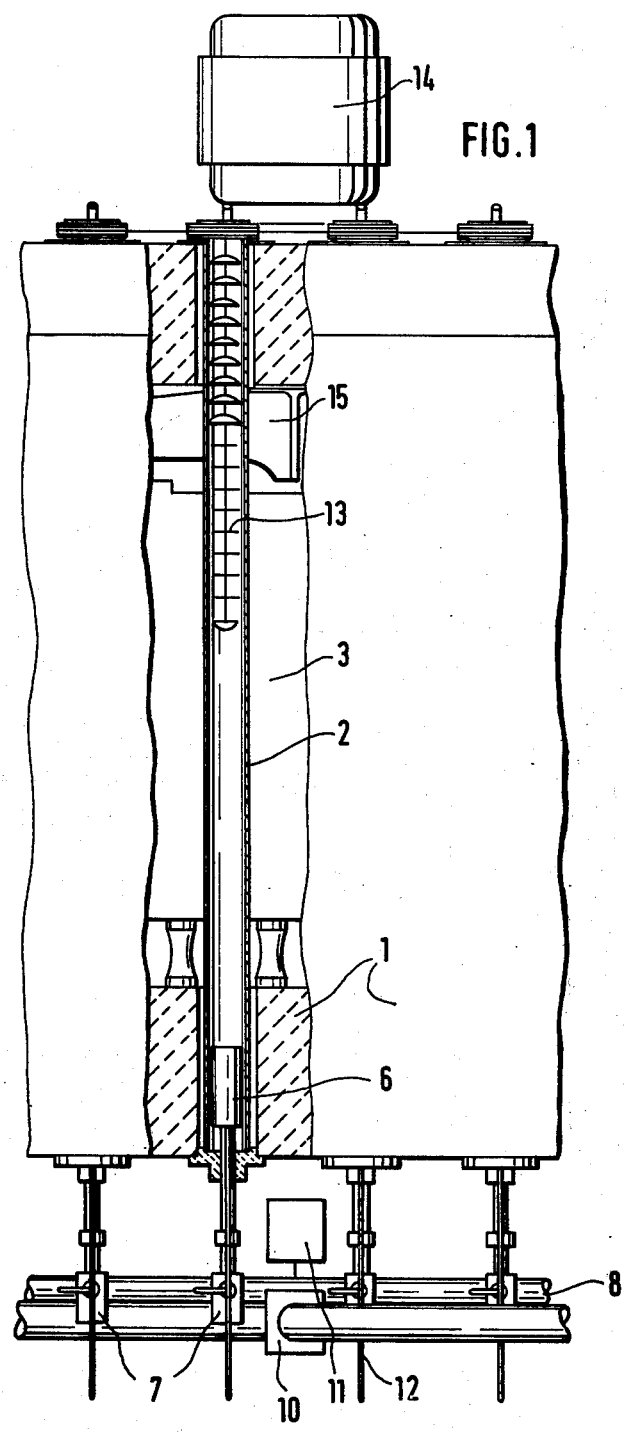
FIG. 1 is a side elevational view showing part of an industrial furnace with a jet pipe shown partly in section.
Figure 2:
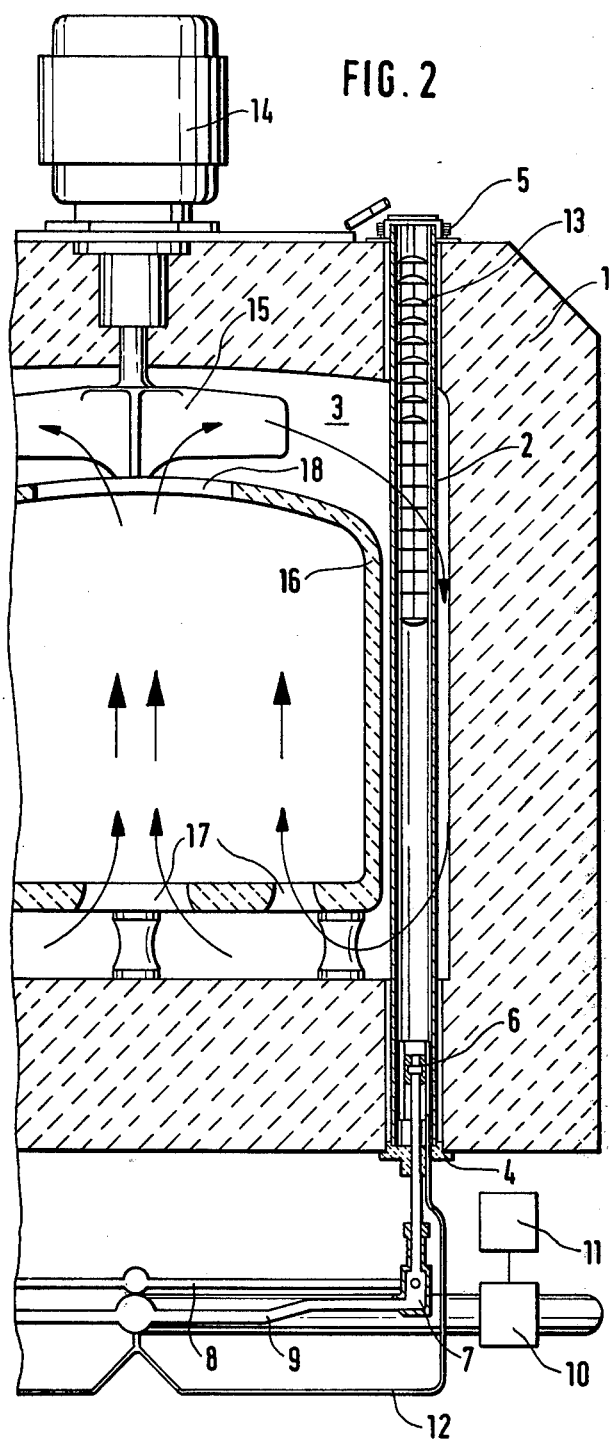
FIG. 2 is an enlarged sectional view taken through the furnace shown in FIG. 1 and showing one of the jet pipes.

In FIGS. 1 and 2 an industrial furnace is illustrated having an outer casing constructed substantially of refractory brick work 1. A number of jet pipes 2 are arranged along both sides of the furnace and they extend in side-by-side relation through the interior 3 of the furnace to which they supply heat. The jet pipes are sealed from the brick work 1 by seals 4 and 5 at the inlet and the outlet openings, respectively.

A burner 6 is arranged in the lower part of each jet pipe 2. Fuel gas is supplied to the burner 6 from a gas-air mixer 7. A fuel gas pipe 8 and an air supply pipe 9 are connected to the gas-air mixer 7. The supply of gas and air is controlled by a central valve 10 via a servomotor 11. The number of jet pipes provided depends upon the size of the furnace and the temperatures required in its working range. All gas-air mixers 7 are supplied from the common gas and air pipes 8 and 9 and are controlled from the central valve 10. An additional air pipe 12 supplies cooling air to the burner 6.

In this embodiment, a flame breaker 13 is provided in the upper part of the jet pipe for better utilization of the heat. The flame breaker also prevents the heating gas from issuing too rapidly into the interior 3 of the furnace.

Supported from the brick work 1 in the roof is a blower 15 which is driven by a motor 14. Blower 15 insures proper circulation of a protective gas by blowing the gas over the jet pipes 2 and into the bottom of the furnace chamber 16. Furnace chamber 16 contains the workpieces to be heat treated within the furnace. The heated protective gas flows in through the inlets 17 and out through the outlets 18, note the arrows illustrating the flow path, for heat treating the workpieces.

Figure 3:
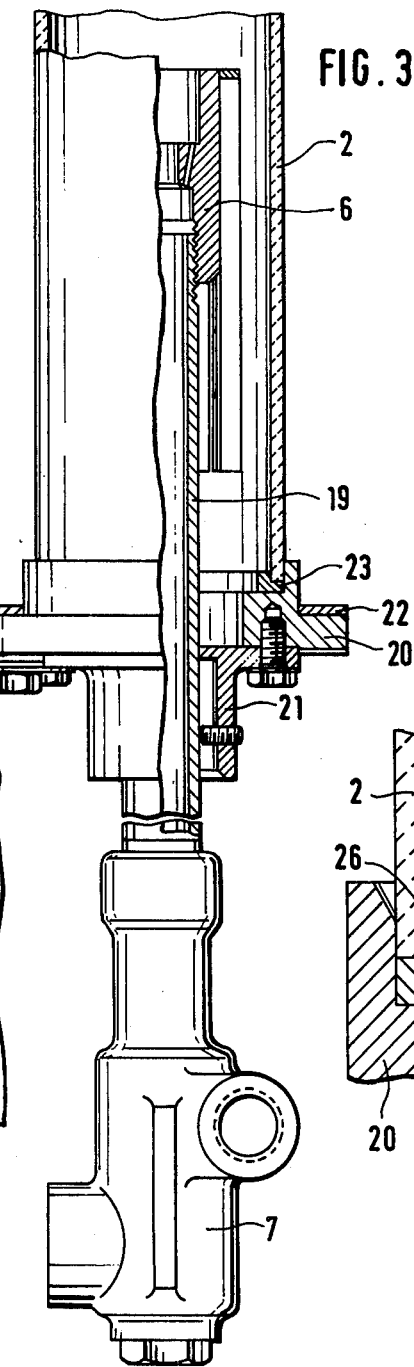
FIG. 3 is an enlarged partly sectional and partly elevational view of a jet pipe showing the burner and seal.

FIG. 3 shows in detail a jet pipe with a burner 6 arranged within the jet pipe. Fuel gas flows from the gas-air mixer 7 through burner pipe 19 to the burner 6. Burner pipe 19 is surrounded by a burner coupling 21 carrying a flange 20. Flange 20 has a seal 22 sealing it from the brick work 1 and another seal 23 which seals it from jet pipe 2. The jet pipe seal 23 is subjected to very high stresses and serves to prevent the burner gas from flowing into the interior 3 of the furnace. Similarly, seal 23 also serves to prevent protective gas within the furnace from flowing into the jet pipe 2.

Figure 4:
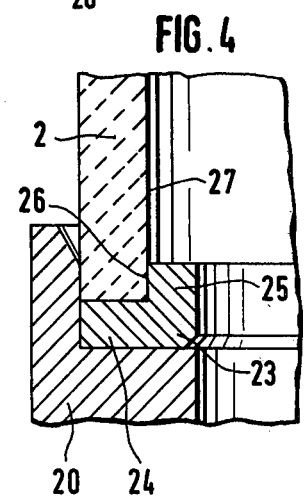
FIG. 4 is a sectional view showing the seal of FIGS. 1 and 2.

One embodiment of the jet pipe seal 23 is shown in section in FIG. 4. The seal 23 is arranged in a recess 24 of the burner flange 20. The seal 23 has a cylindrical projection 25 extending from an annular member and the projection has an outside diameter corresponding to the inside diameter 27 of jet pipe 2. Accordingly, the jet pipe 2 is accurately guided, since it receives guidance both on the inside and on the outside.

Additionally, the guidance of the jet pipe plus the tight sealing arrangement have a positive effect on the wear of the jet pipes, which preferably are made of ceramic materials, since the jet pipe seal 23, which is in the plastic state in the operative temperature range of the furnace, absorbs vibration and shocks. The seal is formed of a lead-copper alloy with the lead portion being in the range of 60% to 70% and the cooper portion being in the range of 40% to 30% by weight.

Figure 5:
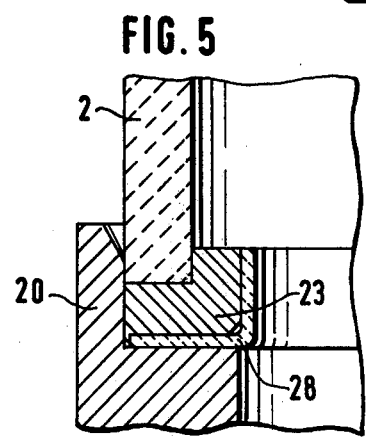
FIG. 5 is a sectional view showing the seal of FIG. 3 with a supporting angle ring.

The jet pipe seal 23 shown in FIG. 5 is essentially the same as that shown in FIG. 4 and, similarly, is made of a lead-copper alloy, but in addition it has a supporting angle ring 28. Preferably, the supporting angle ring 28 is made of heat resistant steel and prevents the sealing material from flowing into the jet pipe 2.

While the invention has been described and illustrated with respect to certain embodiments which produce satisfactory results, it will be understood by those skilled in the art, after understanding the purposes of the invention that various other changes and modifications may be made without departing from the spirit and scope of the invention, and it is therefore intended in the appended claims to cover all such changes and modifications.

What is claimed is:

1. In an industrial furnace arranged to carry out a treatment process, said furnace being constituted for operation in the performance of said treatment process within a specific predetermined operating range of temperatures, and including at least one jet pipe extending through the interior of said furnace, a burner located in operative relationship with said jet pipe, a flange on said burner with a recess in said flange for receiving in mounting engagement one end face of said jet pipe, and a seal for sealing the interior of said jet pipe from the interior of said furnace, wherein the improvement comprises that said seal is positioned between said end face of said jet pipe and said recess in said flange with said jet pipe end firmly seated in said seal, and that said seal is formed of a specific metalic material which is in the solid state when the temperature within the furnace is below said predetermined operating range of temperatures and which changes into the plastic state whenever the temperature in said furnace increases and is within said predetermined operating range.

2. A seal, as set forth in claim 1, wherein the material of said seal consists of a lead-copper alloy with the lead portion thereof comprising from about 60 to 70% by weight of the alloy, and with the copper portion thereof comprising from about 40 to 30% by weight of the alloy.

3. A seal, as set forth in claim 1, wherein said seal comprises an annular member extending tranversely of the axis of said jet pipe and located in a recess in said flange, the inner diameter of said annular member being smaller than the inside diameter of said jet pipe, said annular member contacting the one end face of said jet pipe, and a cylindrical projection integral with and extending axially into said jet pipe from said annular member with the outside diameter of said cylindrical projection corresponding to the inside diameter of said jet pipe.

4. A seal, as set forth in claim 1, wherein said seal comprises an annular member extending transversely of the axis of said jet pipe and located in the recess in said flange, said annular member having a first surface extending transversely of the axis of said jet pipe and contacting said one end face of said jet pipe and an oppositely facing second surface, said annular member also having a radially inner side and a radially outer side each extending in the axial direction of said jet pipe in the direction between said first and second surfaces of said annular member, and a supporting angle ring for clamping and supporting said seal, said angle ring having a first leg extending transversely of the axial direction of said jet pipe and a second leg extending generally in the axial direction of said jet pipe, said first leg disposed in supporting contact with the second surface of said annular member and said second leg disposed in supporting contact with the radially inner side of said annular member.

* * * * *